(12) United States Patent
Kinnier et al.

(10) Patent No.: US 12,136,046 B2
(45) Date of Patent: Nov. 5, 2024

(54) SYSTEMS AND METHODS FOR SHORT IDENTIFIER BEHAVIORAL ANALYTICS

(71) Applicant: Upside Services, Inc, Washington, DC (US)

(72) Inventors: Alexander Kinnier, Bethesda, MD (US); Richard McPhee, Washington, DC (US)

(73) Assignee: UPSIDE SERVICES, INC, Washington, DC (US)

( * ) Notice: Subject to any disclaimer, the term of this patent is extended or adjusted under 35 U.S.C. 154(b) by 0 days.

(21) Appl. No.: 18/512,445

(22) Filed: Nov. 17, 2023

(65) Prior Publication Data

US 2024/0086746 A1  Mar. 14, 2024

Related U.S. Application Data

(63) Continuation of application No. 18/168,817, filed on Feb. 14, 2023, now Pat. No. 11,842,293, which is a
(Continued)

(51) Int. Cl.
*G06F 16/00* (2019.01)
*G06F 16/28* (2019.01)
(Continued)

(52) U.S. Cl.
CPC ............ *G06N 7/01* (2023.01); *G06F 16/285* (2019.01); *G06F 16/29* (2019.01);
(Continued)

(58) Field of Classification Search
CPC ........................... G06F 16/285; G06F 16/9537
(Continued)

(56) References Cited

U.S. PATENT DOCUMENTS 7,912,830 B2  3/2011  Chen et al.
9,477,988 B2  10/2016  Haggerty et al.
(Continued)

OTHER PUBLICATIONS

Notice of Allowance issued in U.S. Appl. No. 15/428,034 on Mar. 22, 2021, 8 pages.
(Continued)

*Primary Examiner* — Alexandria Y Bromell
(74) *Attorney, Agent, or Firm* — MH2 Technology Law Group, LLP

(57) ABSTRACT

Computing systems, methods, and non-transitory computer-readable storage media are provided. Identifier collisions are determined in historical event data based on short identifiers associated with geographically dispersed first and second event locations. Behavior analytics are performed on multiple short identifiers in the historical event data to generate behavioral models associated with the multiple short identifiers. Adjusted behavioral models are generated based on the determined identifier collisions. A short identifier is obtained and an adjusted behavioral model is determined from among the adjusted behavioral models based on the obtained short identifier. An expected event frequency is determined based on the adjusted behavioral model. An actual event frequency is determined and an indication of an incremental event value is transmitted based on a determination that the expected event frequency is greater than the actual event frequency, whereby a notification corresponding to the indication of the incremental event value is displayed to a user.

16 Claims, 8 Drawing Sheets

Related U.S. Application Data continuation of application No. 17/366,454, filed on Jul. 2, 2021, now Pat. No. 11,605,014, which is a continuation of application No. 15/428,034, filed on Feb. 8, 2017, now Pat. No. 11,068,798.

(60) Provisional application No. 62/293,109, filed on Feb. 9, 2016.

(51) Int. Cl.
*G06F 16/29* (2019.01)
*G06F 16/9537* (2019.01)
*G06N 7/01* (2023.01)
*G06N 20/00* (2019.01)
*H04L 67/50* (2022.01)

(52) U.S. Cl.
CPC ......... *G06F 16/9537* (2019.01); *G06N 20/00* (2019.01); *H04L 67/535* (2022.05)

(58) Field of Classification Search
USPC ........................................................ 706/14
See application file for complete search history.

(56) References Cited

U.S. PATENT DOCUMENTS

| | | | |
|---|---|---|---|
| 10,432,659 | B2 | 10/2019 | Ross |
| 2014/0222570 | A1* | 8/2014 | Devolites ................ H04W 4/02 705/14.58 |
| 2015/0339686 | A1* | 11/2015 | Garcia ............... G06Q 30/0204 705/7.33 |
| 2016/0180358 | A1 | 6/2016 | Battista |
| 2017/0070521 | A1 | 3/2017 | Bailey et al. |
| 2017/0228657 | A1 | 8/2017 | Kinnier et al. |
| 2018/0204111 | A1 | 7/2018 | Zadeh et al. |
| 2019/0295018 | A1* | 9/2019 | Borodow ............. H04M 15/84 707/707 |
| 2021/0334686 | A1 | 10/2021 | Kinnier et al. |
| 2023/0196150 | A1 | 6/2023 | Kinnier et al. |

OTHER PUBLICATIONS

Notice of Allowance issued in U.S. Appl. No. 17/366,454 on Nov. 16, 2022, 12 pages.
Notice of Allowance issued in U.S. Appl. No. 18/168,817 on Aug. 4, 2023, 13 pages.

* cited by examiner

SYSTEMS AND METHODS FOR SHORT IDENTIFIER BEHAVIORAL ANALYTICS

CROSS REFERENCE TO RELATED APPLICATIONS

This application is a continuation of co-pending U.S. patent application Ser. No. 18/168,817 filed on Feb. 14, 2023, which is a continuation of U.S. Pat. No. 11,605,014 issued on Mar. 14, 2023, which is a continuation of U.S. Pat. No. 11,068,798 issued on Jul. 20, 2021, which claims the benefit of U.S. Provisional Patent Application No. 62/293,109 filed on Feb. 9, 2016. The contents of the abovementioned applications and patents are hereby incorporated by reference herein in their entirety.

BACKGROUND

Behavioral analytics is a mathematical approach to analyzing patterns in historical data and predicting future actions for the same or similar entities associated with the historical data. For example, behavioral analytics can be used in application development to determine how users will use an application and to predict future usage and preferences, in distributed computer systems to predict usage trends and traffic loads on individual devices, in security systems to detect compromised credentials and threats by locating anomalous behavior, and in ecommerce and retail systems to recommend products, predict future sales, and adjust prices to increase revenue.

Behavioral analytics may be performed using massive amounts of historical event data. The historical event data can include identifiers that identify or distinguish between individual entities (e.g., devices, users, companies, etc.), and behavioral analytics systems can use the identifiers to determine patterns and predict future actions of individual entities. The use of short identifiers can reduce storage requirements for the historical event data, as well as increase processing speeds of behavioral analytics devices and transmission speeds in a distributed behavioral analytics system. Additionally, some historical event data sets may utilize short identifiers to provide a measure of security for the entities associated with the historical event data. For example, credit card transaction histories can be used to determine user patterns and predict future transactions, but the entire credit card number is private information and may not be available in the historical event data.

Short identifiers can be short strings or short integers that are used as identifiers. Short integers can be stored as a "short" integer variables in programming languages such as C, C++, C #, and Java™, and a "short" integer variable may be 16 bits or less in size, instead of, for example, a regular or "long" integer variable that may be 32 bits or more. Accordingly, more short identifiers can be stored in less space, short identifiers can be processed faster, and/or short identifiers can be transmitted faster than, for example, identifiers that use regular or "long" integers or long strings.

However, the use of short identifiers can result in complications in matching historical event data to specific entities. For example, if the short identifiers are short integers with a maximum of four digits, then the maximum number of unique identifiers is 10,000. If there are more than 10,000 entities represented in the historical event data, then identifier collisions can occur where at least two entities are represented by the same identifier. Generally, identifier collisions can result in less accurate pattern recognizing and/or future predictions.

Accordingly, there is a need for systems and methods for performing behavioral analytics using short identifiers, while mitigating the effect of identifier collisions.

SUMMARY

In a first aspect of various embodiments, a computing system is provided. The computing system includes one or more processors and a memory system having stored therein instructions that, when executed by the one or more processors, cause the one or more processors to perform operations. According to the operations, identifier collisions, based on short identifiers associated with a first event location and short identifiers associated with a second event location geographically dispersed from the first event location, are determined in historical event data. Behavior analytics are performed on multiple short identifiers in the historical event data to generate behavioral models associated with the multiple short identifiers. Adjusted behavioral models are generated based on the determined identifier collisions. A short identifier is obtained, and based on the obtained short identifier, an adjusted behavioral model from among the adjusted behavioral models is determined. An expected event frequency based on the adjusted behavioral model is determined. An actual event frequency is determined and an indication of an incremental event value based on a determination that the expected event frequency is greater than the actual event frequency is transmitted, whereby a notification corresponding to the indication of the incremental event value is displayed to a user.

In a second aspect of various embodiments, a method is provided. According to the method, an average percentage of identifier collisions are determined in historical event data based on short identifiers associated with a first event location and short identifiers associated with a second event location geographically dispersed from the first event location. A first short identifier associated with at least one event in the historical event data is assigned to a cohort associated with a first event type of the first event location. The first short identifier is assigned to a cohort associated with a second event type of the first event location, wherein the second event type is different from the first event type. While a next first short identifier exists, the next first short identifier is obtained and assigned to the cohort associated with the first event type and is assigned to the cohort associated with the second event type. Behavior analytics are performed on the cohort associated with the first event type and the cohort associated with the second event type to generate behavioral models associated with multiple first short identifiers. Adjusted behavioral models are generated based on the determined average percentage of identifier collisions and a short identifier is obtained. Whether the short identifier is associated with a previous event of a first event type at the first event location is determined. One of a new event value for the first event type or an incremental event value for the first event type is calculated based on whether or not the short identifier is associated with the previous event of the first event type. A client device is notified using either the new event value or the incremental event value, whereby the client device displays a notification regarding either the new event value or the incremental event value in response to receiving either the notification of the new event value or the notification of the incremental event value.

In a third aspect of various embodiments, a method is provided. According to the method, identifier collisions, based on short identifiers associated with a first event location and short identifiers associated with a second event location geographically dispersed from the first event location, are determined in historical event data. Behavior analytics are performed on multiple short identifiers in the historical event data to generate behavioral models associated with the multiple short identifiers. Adjusted behavioral models are generated based on the determined identifier collisions. A short identifier is obtained, and based on the obtained short identifier, an adjusted behavioral model from among the adjusted behavioral models is determined. An expected event frequency based on the adjusted behavioral model is determined. An actual event frequency is determined and an indication of an incremental event value based on a determination that the expected event frequency is greater than the actual event frequency is transmitted, whereby a notification corresponding to the indication of the incremental event value is displayed to a user.

In a fourth aspect of various embodiments, a non-transitory computer-readable medium is provided that has instructions recorded thereon for at least one processor of a computing device. The instructions configure the at least one processor to perform operations. According to the operations, identifier collisions, based on short identifiers associated with a first event location and short identifiers associated with a second event location geographically dispersed from the first event location, are determined in historical event data. Behavior analytics are performed on multiple short identifiers in the historical event data to generate behavioral models associated with the multiple short identifiers. Adjusted behavioral models are generated based on the determined identifier collisions. A short identifier is obtained, and based on the obtained short identifier, an adjusted behavioral model from among the adjusted behavioral models is determined. An expected event frequency based on the adjusted behavioral model is determined. An actual event frequency is determined and an indication of an incremental event value based on a determination that the expected event frequency is greater than the actual event frequency is transmitted, whereby a notification corresponding to the indication of the incremental event value is displayed to a user.

DETAILED DESCRIPTION

The following detailed description is provided with reference to examples of embodiments for ease of description and understanding. The present teachings are not limited to the disclosed embodiments, and encompass other variations that fall within the overall scope of description provided herein.

As noted above, a behavioral analytics system can process historical event data that uses short identifiers to identify specific entities. The processing can result in behavioral models that are specific to the historical event data and/or specific to individual entities. As discussed above, the use of short identifiers can allow for behavioral analytics using data where only short identifiers are available (e.g., credit card transaction histories that include only the last four digits of each credit card number), can reduce storage requirements for the historical event data, can improve processing speeds of behavioral analytics devices, can improve transmission speeds in a distributed behavioral analytics system, and can provide additional technical benefits.

In some embodiments, a collision decay analysis can be performed using historical event data to compute an average percentage of identifier collisions between disjoint events in the historical raw data. As used herein, disjoint events are events where a probability that the same entity would be associated with both events is very low (e.g., less than 1% or less than 5%). For example, disjoint events can be events that occur at geographically dispersed locations (e.g., an event that occurs in California and an event that occurs in Virginia).

Because disjoint events are unlikely to be associated with the same entity, even when the same identifier is associated with the disjoint events, that identifier is likely to be representing two different entities (i.e., an identifier collision). In a sample data set, the percentage of identifiers associated with or representing two different entities can be used to compute an average percentage of identifier collisions, as discussed in further detail below.

The average percentage of identifier collisions can then be accounted for in a cohort analysis performed using the historical event data to estimate future actions and assign new event values, as also discussed in further detail below.

Figure 1:
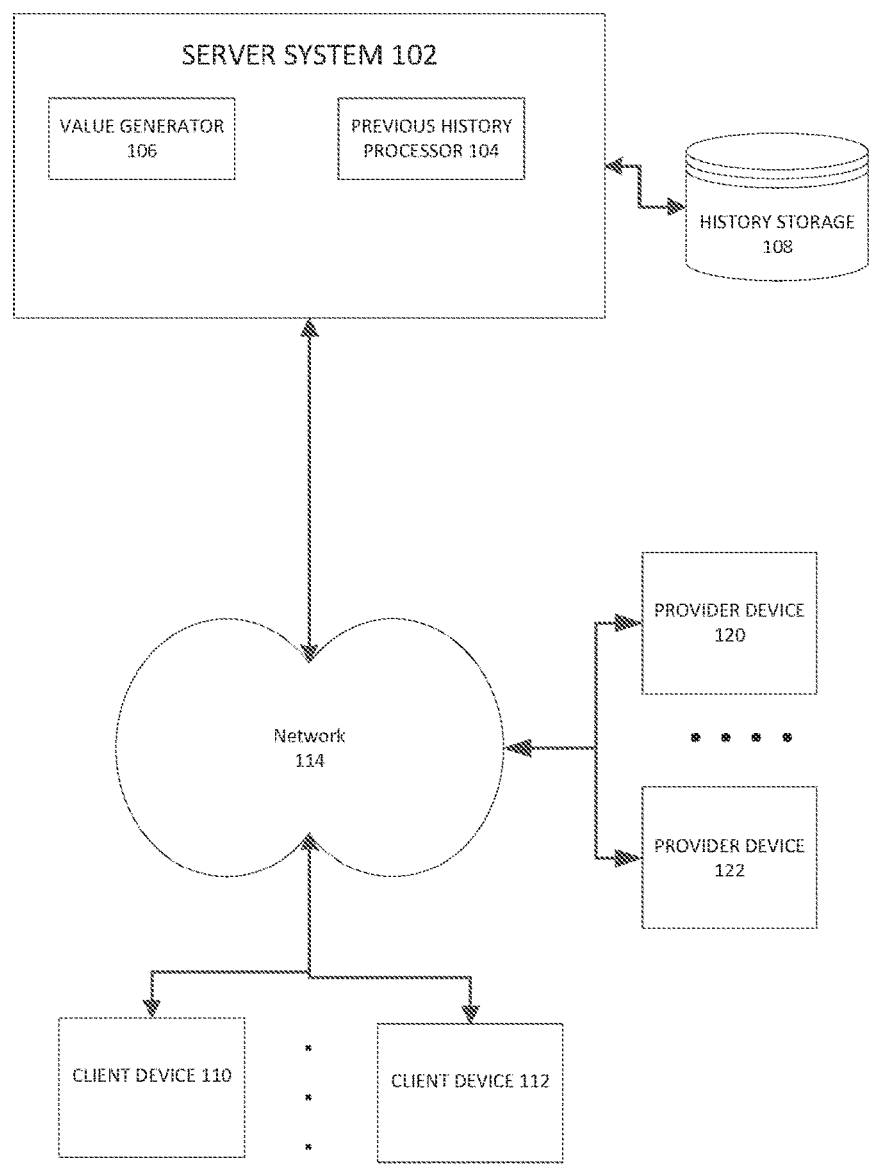
FIG. 1 depicts an example of a system environment, in accordance with some examples of the present disclosure.

FIG. 1 depicts an example of a system environment 100 in accordance with examples of the present disclosure. As shown in FIG. 1, the system environment 100 includes an administrative server system 102. The server system 102 includes a previous history processor 104 and a value generator 106. The server system 102 may further include, or be communicatively linked to, a history storage 108.

In various embodiments, the server system 102 can access historical event data from the history storage 108 and process the historical event data using the previous history processor 104. The processed historical event data can be used to generate new event values using the value generator 106. As used herein historical event data can include, among other things, dates and times of events, locations of events, short identifiers of entities associated with the events, values of the events, identifiers of types of the events, etc. One example of historical event data is records of purchases made with credit cards, where the credit card number is represented by only its last four digits.

The system environment 100 further includes a provider device 120 and a provider device 122. The provider devices 120 and 122 are devices that receive and transmit historical event data and/or new event data. For example, an owner of a gas station that includes a convenience store may operate point-of-sale systems represented by the provider device 120 and the provider device 122, where the provide device 120 collects event input for inside purchases at the convenience store and the provider device 122 collects event input for gasoline sales. As shown in FIG. 1, the provider device 120 and the provider device 122 can communicate with the server system 102 via a network 114.

In some embodiments, the provider devices 120 and 122 may access a graphical user interface provided, for example, by the server system 102, in order to provide event data to and receive new event values from the server system 102. Using the graphical user interface, information may be provided to the server system 102 regarding the provider devices 120 and 122, such as, for example, a name and address of the location of the provider devices 120 and 122, a number and location of point-of-sale terminals at the location, previous event information (e.g., credit card transaction logs), products and/or services that are associated with events at the location, prices for products and/or services that are offered at the location, volumes of sales of products and/or services at the location, baseline values to be achieved for sales of products and/or services, expected revenue growth at the location, and profit margin information for products and/or services that are offered at the location.

The system environment 100 may further include a client device 110 and a client device 112. The client devices 110 and 112 may be operated by entities that are associated with events at locations associated with the provider devices 120 and 122, such as smart phones operated by customers that purchase gas and snacks at the gas station/convenience store. The client devices 110 and 112 may receive, via a graphical user interface, new event information (e.g., a new event value) regarding a product or service associated with a location. In various implementations, the new event information may be, for example, an electronic coupon for a discount on a product or service associated with a location. This information may be transmitted from the server system 102 to the client devices 110 and 112. Similarly, the client devices 110 and 112 may provide information to the server system 102, such as a current location, an identifier (e.g., a short identifier) associated with the device or a user of the device, etc.

It may be appreciated that additional provider devices, client devices, and server systems may reside within the system environment 100.

Figure 2:
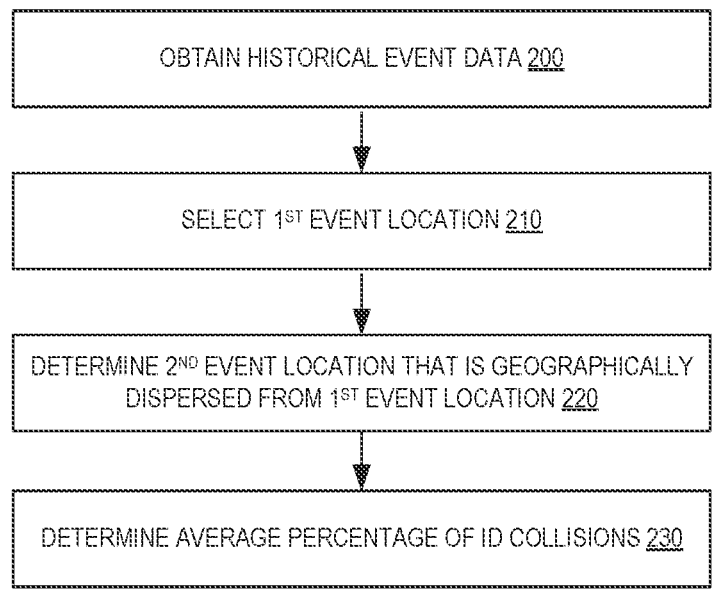
FIG. 2 depicts an example of a flow diagram of a process for performing a collision decay analysis, in accordance with some examples of the present disclosure.

FIG. 2 depicts an example of a flow diagram of a process for performing a collision decay analysis, in accordance with some examples of the present disclosure. The process depicted in FIG. 2 may be performed using a computing device such as, for example, the server system 102 (e.g. using the previous history processor 104) as depicted in FIG. 1.

The process can begin in 200, when the computing device receives historical event data that includes event data associated with multiple identifiers and multiple locations. The identifiers can be short identifiers, such as, for example, four digit integers.

In some embodiments, other data that can be included in the historical event data can include name and address information for the event location, an identifier of a point-of-sale terminal at the event location, etc.

In 210, the computing device can select a first location from among the multiple locations in the historical event data. In some embodiments, the first location can be selected randomly. In other embodiments, the first location can be selected programmatically (e.g., the location associated with a first event sequentially in the historical event data, a non-centralized location, etc.). In further embodiments, the first location can be user-selected.

In 220, the computing device can select a second location from among the multiple event locations in the historical event data, where the second location is geographically dispersed from the first location. In some embodiments, the second location can be selected randomly based on certain criteria (e.g., selected randomly from among locations that are greater than a threshold distance away from the first location, such as, for example, more than 1,000 kilometers). In other embodiments, the second location can be selected programmatically (e.g., the location associated with a first event sequentially in the historical event data that is greater than a threshold distance away from the first location, etc.). In further embodiments, the second location can be user-selected. However, an error message may be sent to the user if the user-selected second location is closer than a threshold distance away from the first location.

In 230, the computing device can determine an average percentage of identifier collisions by determining the number of identical short identifiers that occur at the first location and at the second location.

For example, the events can represent purchases from a first convenience store at a first location and a second convenience store at a second location that is greater than 1,000 kilometers away from the first location. The historical event data can be a history of credit card transactions at the first and the second location, and the short identifier can be the last four digits of the credit card numbers. Generally, there is a low probability (e.g., less than 1%) that the owner of the same credit card would make a purchase at the first convenience store and a purchase as the geographically dispersed second convenience store within a limited time window (e.g., one month). Therefore, if the same last four digits represent events that occurred at both the first and the second convenience store, these events can be identified or labelled as an identifier collision. The number of identifier collisions can be compared to (e.g., divided by) the total number of unique identifiers at one or both locations to determine or calculate the average percentage of identifier collisions.

In some embodiments, 200-230 can be performed multiple times for multiple sets of geographically dispersed locations. The average percentage of identifier collisions from multiple iterations of 200-230 using the multiple data sets can be aggregated and/or averaged to determine a global average percentage of identifier collisions.

In other embodiments, 200-230 can be performed multiple times for multiple sets of geographically dispersed locations with different population sizes. The population size can represent the number of unique entities associated with events at an event location during a time window. The average percentage of identifier collisions from multiple iterations of 200-230 using the multiple data sets can be aggregated and/or analyzed to determine an average percentage of identifier collisions based on the population size associated with the location.

In further embodiments, 200-230 can be performed multiple times for multiple time windows. For example, the first iteration can be for data within a first time window (e.g., a month) and the second iteration can be for data within a second time window (e.g., a subsequent month). The data from the multiple iterations can be aggregated and/or averaged to determine an average percentage of identifier collisions.

In various embodiments, the average percentage of identifier collisions, the global average percentage of identifier collisions, and/or the average percentage of identifier collisions based on the population size can be used to mitigate the effects of identifier collisions in behavioral analytics, as discussed in further detail below.

Figure 3:
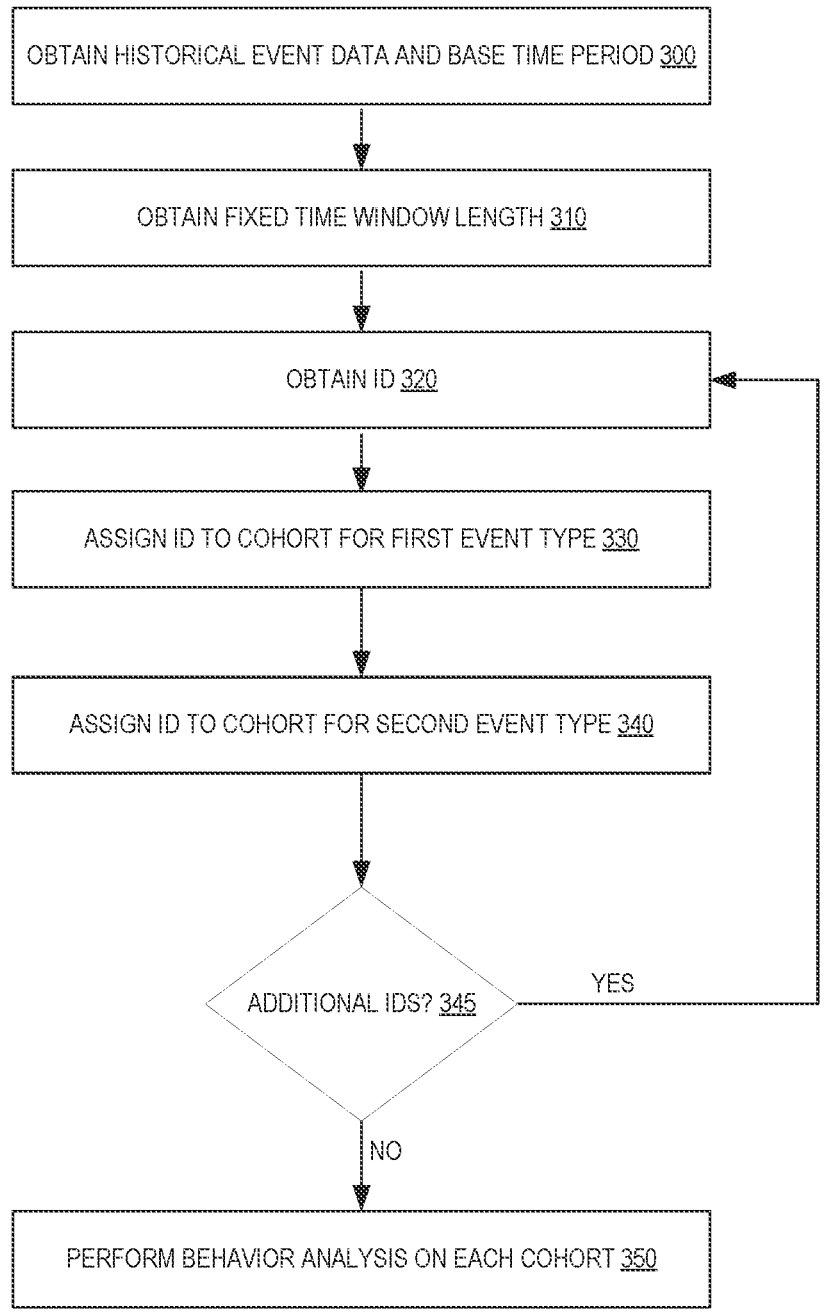
FIG. 3 depicts an example of a flow diagram of a process for performing a cohort analysis, in accordance with some examples of the present disclosure.

FIG. 3 depicts an example of a flow diagram of a process for performing a cohort analysis, in accordance with some examples of the present disclosure. The process depicted in FIG. 3 may be performed using a computing device such as, for example, the server system 102 (e.g. using the previous history processor 104) as depicted in FIG. 1.

The process can begin in 300, when the computing device receives historical event data that includes event data associated with a location, multiple identifiers, and multiple event types, and obtains a base time window for initiating the analysis. The identifiers can be short identifiers, such as, for example, four digit integers. The base time window can be a time window of any length with a specific starting time. For example, the base time window can be a time period of one month that starts on the first day of a specific calendar month (e.g., Jan. 1, 2017 at 12:00 AM).

In 310, the computing device can receive a fixed time window length for performing a cohort analysis. In some embodiments, the fixed time window length can be a multiple of the length of the base time window received in 300. For example, if the base time window length is one month, the fixed time window length can be three months.

In 320, the computing device can begin a first iteration of 320-345 for a first identifier. The computing device can obtain a first identifier associated with at least one event in the historical event data. The first identifier can be obtained by, for example, obtaining an identifier associated with a first event sequentially and/or chronologically in the historical event data, obtaining an identifier associated with a random event in the historical event data, obtaining a user-selected identifier, etc.

In 330, the computing device can assign the identifier to a cohort associated with a first event type. In some embodiments, each event type can be associated with multiple cohorts, and each cohort can represent, for example, a number of times that an identifier is associated with the event type during the base time window. As an example, the base time window can be Jan. 1, 2017-Jan. 31, 2017 and the event type can be a gasoline purchase at a gas station/convenience store. This event type can be associated with six cohorts representing zero, one, two, three, four, and five or more gasoline purchase events by a single identifier during the base time window. Accordingly, if the identifier obtained is associated with one gasoline purchase event during the base time window, the identifier can be assigned to the cohort associated with one gasoline purchase.

In various embodiments, each event type can be associated with a table, a database, or other data structure the represents the cohorts and the associated with identifiers. As noted previously, in various embodiments, the use of short identifiers provides a technical improvement by allowing the system to store the data structure in less space and to process it more efficiently than would be possible using full-length identifiers, such as 16-digit credit card numbers.

In 340, the computing device can assign the identifier to a cohort associated with a second event type that is different from the first event type but is associated with the same location (e.g., a gas station/convenience store). For example, if the first event type is a gasoline purchase, the second event type can be a convenience store purchase. In some embodiments, the identifier can be assigned to a cohort based on a number of times the identifier is associated with a specific event type (e.g., the second event type) during the base time window.

In various embodiments, the first event type and the second event type can be correlated with each other because the first event type and the second event type are associated with the same location (e.g., a gas station/convenience store).

In 345, the computing device can determine if there are additional identifiers that have not been assigned to cohorts for the first and second event types. If there are additional identifiers (345; YES), the computing device can begin a subsequent iteration of 320-345 by obtaining a subsequent identifier associated with at least one event in the historical event data. The subsequent identifier can be obtained by, for example, obtaining an identifier associated with a next event sequentially and/or chronologically in the historical event data, obtaining an identifier associated with a random event in the historical event data, obtaining a user-selected identifier, etc. Then the computing device can perform 330 and 340 for the subsequent identifier.

In some embodiments, 320-345 can be performed for each identifier in the historical event data, and/or until, in 345, the computing device determines that there are no additional identifiers in the historical event data (345; NO). Then the computing device can proceed to 350.

In 350, the computing device can perform a behavioral analytics process on each cohort and event type to predict future behavior based on the historical event data for the base time window. The behavioral analytics process can be performed using, for example, a computer learning behavioral analytics algorithm. In various embodiments, the results of the behavioral analytics process can be behavioral models for each cohort and event type.

In some embodiments, the computer learning behavioral analytics algorithm can be performed and/or the behavioral models can be adjusted using an average percentage of identifier collisions (e.g., as determined in FIG. 2). Accordingly, if the historical event data uses short identifiers, the identifier collisions can be accounted for and mitigated against.

In some implementations, a cohort analysis can be performed for a time window subsequent to the base time window in the fixed time window, while, in further implementations, cohort analyses can be performed for the time window subsequent to the base time window, as well as for each other time windows in the fixed time window.

A single iteration of 320-350 can represent a cohort analysis for a single event type. In some embodiments, the cohort analysis can additionally be for a single location. In further embodiments, additional iterations of 320-350 can be performed for different event types at the same location and/or for the same or different event types at different locations. Cohort analyses for different event types (e.g., gasoline purchases, convenience store purchases, automotive services, car washes, etc.) at the same location can be used for obtaining new event values, as described, for example, in FIGS. 6-7.

Figure 4:
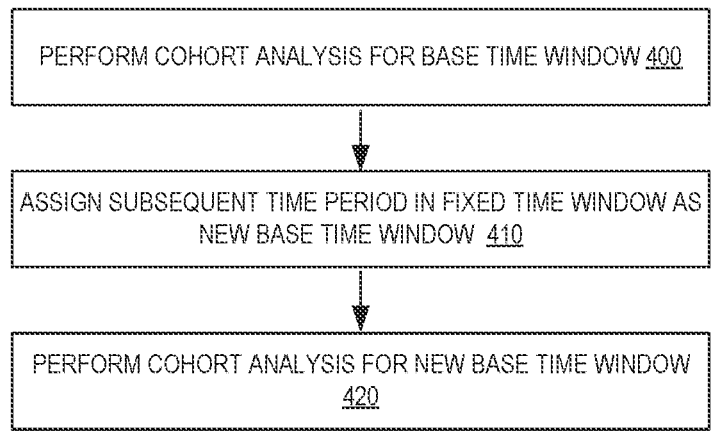
FIG. 4 depicts an example of a flow diagram of a process for performing a cohort analysis, in accordance with some examples of the present disclosure.

FIG. 4 depicts an example of a flow diagram of a process for performing a cohort analysis, in accordance with some examples of the present disclosure. The process depicted in FIG. 4 may be performed using a computing device such as, for example, the server system 102 (e.g. using the previous history processor 104) as depicted in FIG. 1.

The process can begin in 400, when the computing device performs a cohort analysis for a base time window (e.g., similar to that described above with regard to FIG. 3).

In 410, the computing device can assign a subsequent time window (e.g., the next time period in chronological sequence and/or as received in 310 in FIG. 3) as the new base time window and the fixed time window can be correspondingly adjusted. For example, if the base time window is January 2017 and the fixed window is three months (i.e., January 2017-March 2017), the new base time window can be February 2017 and the adjusted fixed window can be February 2017-April 2017.

In 420, the computing device can perform the cohort analysis (e.g., similar to the cohort analysis described above with regard to FIG. 3) but with the new base time window as the base time window. 410-420 can be repeated multiple times. Accordingly, cohort analyses can be performed multiple times over a rolling sequence of time windows in order to analyze the predictability of event types over a longer course of time. Thus, a more accurate behavioral analytics process can be performed and future behavior can be derived or predicted by taking, for example, the average, minimum, and maximum values from across each of the multiple cohort analyses.

In various embodiments, a cohort analysis can be used to compute probabilities of an identifier being associated with an event having a specific event type during a specified future or current time window. Because the identifier is associated with a cohort, the behavior associated with all identifiers in the cohort can be used to model future behavior, resulting in a more accurate behavior model that can be used to compute the probabilities of a specific event occurring in the future.

Figure 5:
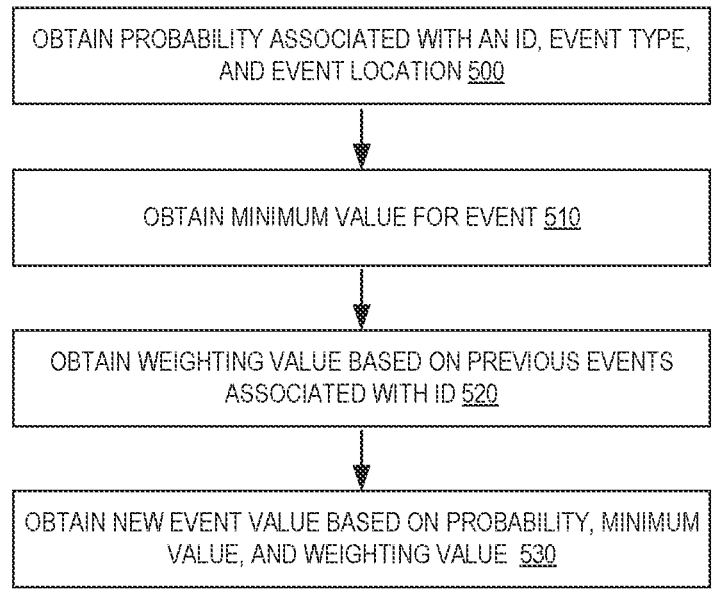
FIG. 5 depicts an example of a flow diagram of a process for obtaining a new event value based on a probability of a future event, in accordance with some examples of the present disclosure.

FIG. 5 depicts an example of a flow diagram of a process for obtaining a new event value based on a probability of a future event, in accordance with some examples of the present disclosure. The process depicted in FIG. 5 may be performed using a computing device such as, for example, the server system 102 (e.g. using the previous history processor 104) as depicted in FIG. 1.

In various embodiments, the process depicted in FIG. 5 can be initiated based on receiving an indication that a new event at a specific location has occurred. In other embodiments, the process can be initiated automatically or based on user input. In further embodiments, the process can be initiated based on an indication that a client device (e.g., one of client device 110 and 112 shown in FIG. 1) is near the specific location. For example, the client device can be a smartphone that determines its current position using a Global Positioning System (GPS) receiver, and the client device can send the current position and an indicator of an identifier associated with the client device to the computing device (e.g., to the server 102).

In 500, the computing device can obtain a probability associated with an identifier, an event type, and a location. For example, if the computing device received an indication that a client device associated with an identifier is near the location, the computing device can obtain a probability associated with the identifier, an event type, and the location.

In some embodiments, the probability can be obtained based on an individual identifier historical event analysis. In such embodiments, a probabilistic model can be used to describe a baseline of expected behavior specific to each identifier. The history for a location is analyzed over a fixed historical period (e.g., three months), and the average number of actual events of the event type at the location made by each unique identifier is computed over a fixed frequency time span (e.g., four weeks) during the fixed historical period. The average expected number of future events of the event type at the location for a unique identifier over the fixed historical period for the frequency time span can then be modeled. For example, the average expected number of future events can be modeled using the formula:

$$\text{expected number of future events}_f^{ID} = \frac{\sum_{i=0}^{n} \text{actual events}_i^{ID}}{n}$$

where f is the frequency time span, ID is the identifier, n is the number of time spans of frequency f in the fixed historical period, actual events$_i^{ID}$ is the actual number of events associated with the identifier during the ith frequency time span in the fixed historical period, and expected number of future event$_f^{ID}$ is the average number of expected events that the identifier is expected to be associated with in a time period of f.

In 510, the computing device can determine a minimum value for the event type at the location. In various embodiments, the minimum value can be a value that is specified by the owner of the location. For example, if the event type is a gasoline purchase, the minimum value can represent a minimum value at which the owner will sell gasoline (e.g., $2.00 per gallon). In other embodiments, the minimum value can be programmatically determined based on, for example, an indicated margin on average transaction values (e.g., indicated in a cash value or as a percentage of a transaction).

In 520, the computing device can obtain a weighting value for the event type. The weighting value can be a value that allows for the adjustment of the event value based on incentives or disincentives for specific cohorts. In some embodiments, the weighting value can be automatically calculated based on observed changes in event patterns associated with an identifier over time in response to different event values. In other embodiments, the weighting value can be obtained by the owner, and can be different values for different cohorts.

In 530, the computing device can obtain a new event value based on the probability, the minimum value, and the weighting value. For example, the new event value can be computed based on the product of the minimum value, the weighing value, and one minus the probability.

In various embodiments, the new event value can be transmitted to a client device (e.g., one of client devices 110 and 112 shown in FIG. 1). Accordingly, for example, when the client device is determined to be near to a location, the client device can notify the computing device, the computing device can determine or calculate a new event value, the computing device can transmit the new event value to the client device, and the client device can display the new event value to a user (e.g., using a corresponding graphical user interface). For example, the computing device can calculate a new gasoline discount (e.g., $0.40 cents per gallon off) for a station near the client device and send a corresponding electronic coupon to the client device for display to the potential customer.

Figure 6:
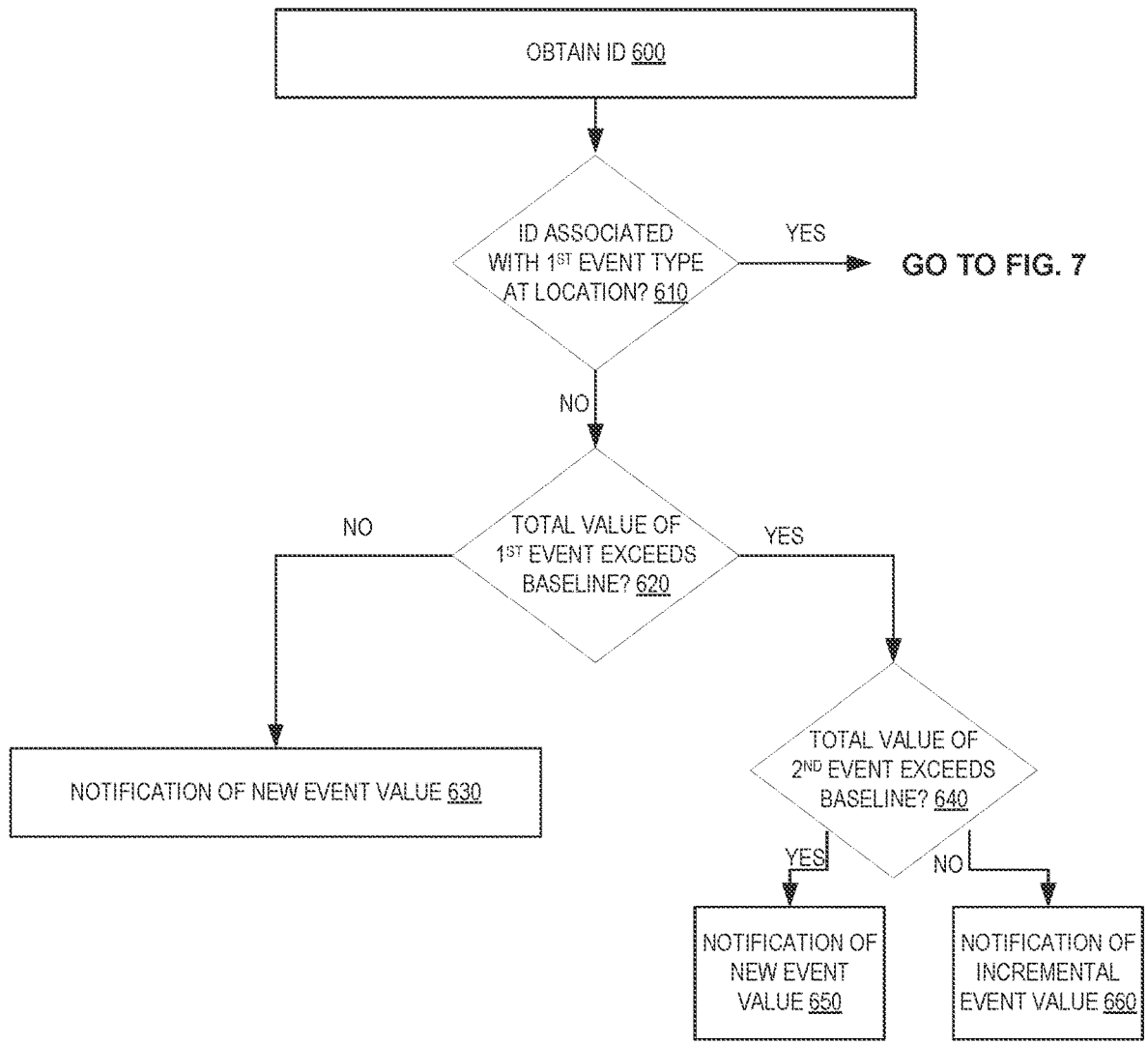
FIG. 6 depicts an example of a flow diagram of a process for determining an event value based on an identifier without a history, in accordance with some examples of the present disclosure.

FIG. 6 depicts an example of a flow diagram of a process for determining an event value based on an identifier without a history, in accordance with some examples of the present disclosure. The process depicted in FIG. 6 may be performed using a computing device such as, for example, the server system 102 (e.g. using the previous history processor 104) as depicted in FIG. 1.

In various embodiments, the process depicted in FIG. 6 can be initiated based on receiving an indication that a new event at a specific location has occurred. In other embodiments, the process can be initiated automatically or based on user input. In further embodiments, the process can be initiated based on an indication that a client device (e.g., one of client device 110 and 112 shown in FIG. 1) is near the specific location. For example, the client device can be a smartphone, the client device can execute an application that determines a current position using a GPS receiver, and sends the current position and an indicator of an identifier associated with the client device to the computing device.

In 600, the computing device can obtain an identifier. For example, if the computing device received an indication of a new event, the computing device can obtain the identifier associated with the new event as well as, for example, an event type and the location of the new event.

In 610, the computing device can determine if the obtained identifier is associated with a previous event of a first event type at the location during a look-back window. For example, the first event type can be a gasoline purchase, and the computing device can determine if the identifier is associated with a previous gasoline purchase during the look-back window (e.g., the previous three months).

In some embodiments, the length of the look-back window can be configured automatically or based on user input. In embodiments where short identifiers are used, the longer the length the look-back window, the more identifier collisions are likely to occur. Accordingly, a collision decay analysis can be used to determine the length of the look-back window so that the risk of an identifier collision is minimized (e.g., is less than 40%, 20%, 10%, 5%, or 1%).

Figure 7:
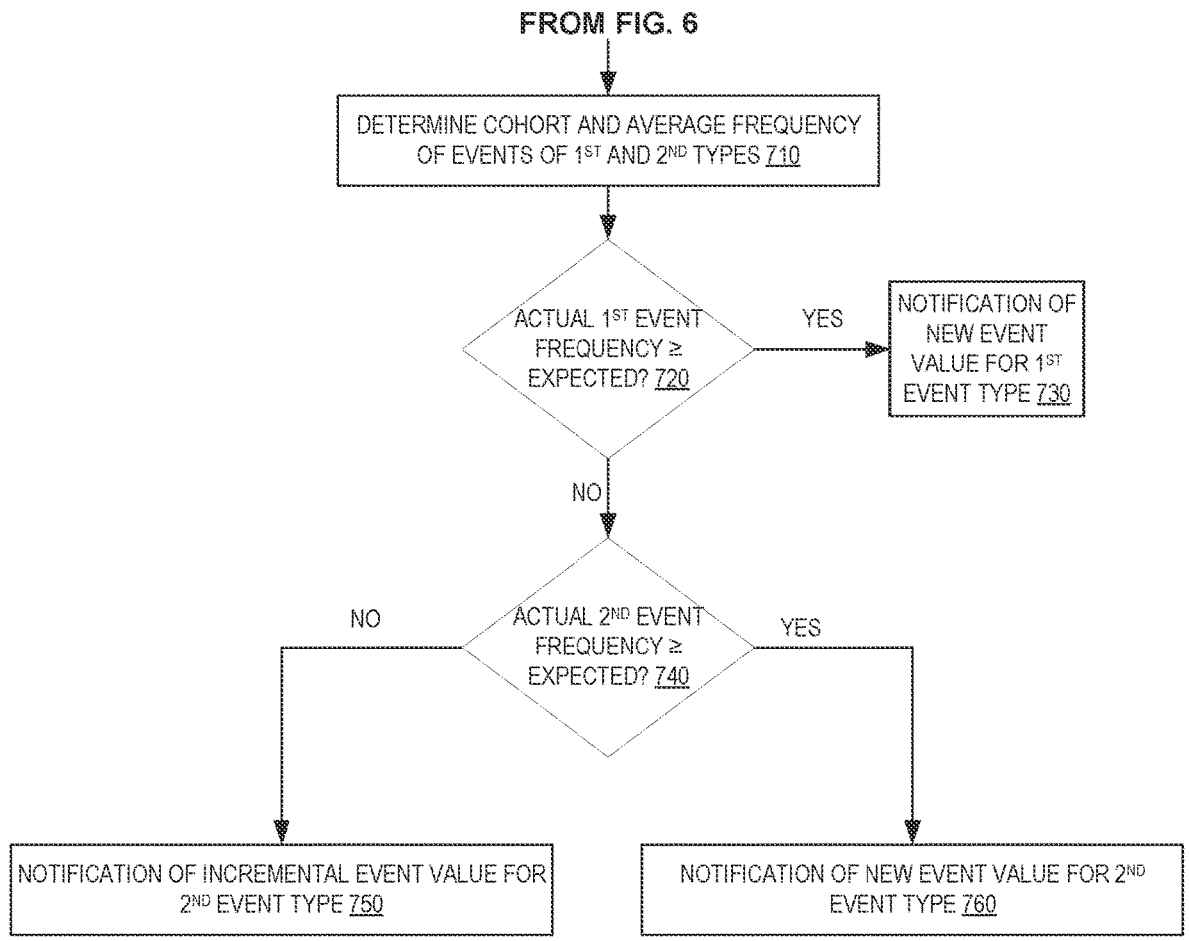
FIG. 7 depicts an example of a flow diagram of a process for determining an event value based on an identifier with a history, in accordance with some examples of the present disclosure.

If, in 610, the computing device determines that the identifier is associated with a previous event of the first event type at the location during the look-back window (610; YES), the process can proceed to 710, as shown in FIG. 7 (described below).

If, in 610, the computing device determines that the identifier is not associated with a previous event of the first event type at the location during the look-back window (610; NO), the process can proceed to 620.

In 620, the computing device can obtain a total value of events associated with the first event type during a current analysis period (e.g., the current month) and can obtain a baseline value associated with the first event type for an analysis period and can determine if the total value of events exceeds the baseline. In some embodiments, the total value of events associated with the first event type can be a total amount of payments received for a particular event type during the current analysis period (e.g., a total amount paid for gasoline purchases).

In some implementations, the baseline value can be determined using an aggregate historical total event value analysis. For example, from historical event data for a location (e.g., a credit card transaction history), a trend analysis can compute revenue growth for the location over the time period of the transaction history based on all event types at the location. The total number of all types of events at the location and the total event values over a fixed frequency time span (e.g., month-to-month) can inform a model of the actual growth trends of the location, which can be used to predict expected growth for the location. The baseline value can be determined using the expected growth, and, in particular, based on an expected total value of events during the analysis period. In other implementations, the baseline value can be determined based on user input.

If, in 620, the computing device determines that the total value of events does not exceed the baseline (620; NO), the process can proceed to 630.

In 630, the computing device can notify a client device of a new event value. In various embodiments, the client device can be a client device that is associated with the identifier obtained in 600. The client device can be running an application, and the application can automatically display or otherwise notify a user of the new event value (e.g., using a graphical user interface). As an example, the new event value can be a new price for gasoline. The new event value can be determined, in some embodiments, using the process described above with regard to FIG. 5.

If, in 620, the computing device determines that the total value of events does exceed the baseline (620; Yes), the process can proceed to 640.

In 640, the computing device can obtain a total value of events associated with a second event type for the same location as the first event type during a current analysis period (e.g., the current month) and can obtain a baseline value associated with the second event type for an analysis period (e.g., based on an aggregate historical total event value analysis or as input by a user) and can determine if the total value of events exceeds the baseline. In some embodiments, the total value of events associated with the second event type can be a total amount of payments received for a second event type during the current analysis period (e.g., a total amount paid for convenience store purchases).

If, in 640, the computing device determines that the total value of events does not exceed the baseline (640; NO), the process can proceed to 660.

In 660, the computing device can notify the client device of an intermediate event value. The client device can be running an application, and the application can automatically display or otherwise notify a user of the new event value (e.g., using a graphical user interface corresponding to the application). As an example, the intermediate event value can be a new price for gasoline that is lower than a regular price but is higher than a new event value that would otherwise be determined in 630 or 650. The intermediate event value can be determined, in some embodiments, based on the process described above with regard to FIG. 5. For example, the intermediate event value can be a numerical average between the new event value, as determined in FIG. 5, and a regular event value.

If, in 640, the computing device determines that the total value of events does exceed the baseline (640; Yes), the process can proceed to 650.

In 650, in some embodiments, the computing device can notify the client device of a new event value for the second event type. The client device can be running an application, and the application can automatically display or otherwise notify a user of the new event value. As an example, the new event value can be a percentage discount on convenience store purchase. The new event value can be determined, in some embodiments, using the process described above with regard to FIG. 5.

In other embodiments, the computing device can notify the client device of a new event value for another event type, such as the first event type (e.g., a discounted price on gasoline) or event types that are not used in 600-640 but are associated with the same location (e.g., a discounted price on a car wash, automotive services, etc.).

In further embodiments, the computing device may not immediately notify the client device, but may store the new event value to notify the client device at a future time. For example, the next time the identifier associated with the client device is associated with the same location, the notification can be sent to the client device.

In still further embodiments, the computing device can store multiple notifications for the same identifier at the same location, and the values of the notifications can accumulate with each new notification. For example, if a first new event value is a $1.00 discount and a second notification is stored for the same identifier and the same location, the computing device may send a notification of a new event value where the new event value is an increased discount (e.g., a $1.50 or a $2.00 discount). If the discount is not used, the next time a new event value is stored for the same identifier and the same location, the notification sent to the user can include a new event value that is a further increased discount (e.g., a $2.15 or a $3.00 discount).

FIG. 7 depicts an example of a flow diagram of a process for determining an event value based on an identifier with a history, in accordance with some examples of the present disclosure. The process depicted in FIG. 7 may be performed using a computing device such as, for example, the server system 102 (e.g. using the previous history processor 104) as depicted in FIG. 1.

In various embodiments, the process depicted in FIG. 7 can be initiated if, in 610 from FIG. 6, the computing device determines that the identifier is associated with a previous event of the first event type at the location during the look-back window (610; YES), as described above.

In 710, the computing device can determine, for the identifier obtained in 600 in FIG. 6, a corresponding cohort for the first event type and a corresponding cohort for the second type. The corresponding cohorts can be determined based on a previously performed cohort analysis (e.g., as described above and shown in FIG. 3).

Based on the determined cohorts, the computing device can determine an expected frequency of occurrence of each event type for the cohort. In some embodiments, an expected frequency can be determined based on the behavior analytics processes performed on each cohort (e.g., in 350 of FIG. 3).

In 720, the computing device can determine whether an actual first event frequency during a current time window is greater than or equal to an expected frequency. For example, based on previously event data, the computing device can determine that the identifier is associated with one previous event of the first event type during the current time window (e.g., the current calendar month).

If, in 720, the computing device determines that the actual first event frequency is greater than or equal to the expected frequency (720; YES), the process can proceed to 730. In other words, the computing device can determine that the type of event has occurred as many times or more than is expected.

In 730, the computing device can notify a client device of a new event value for the first type of event. In various embodiments, the client device can be a client device that is associated with the identifier obtained in 600. The client device can be running an application, and the application can automatically display or otherwise notify a user of the new event value for the first type of event. As an example, the new event value can be a new price for gasoline. The new event value can be determined, in some embodiments, using the process described above with regard to FIG. 5.

In other embodiments, the computing device can notify the client device of a new event value for another event type, such as the second event type (e.g., a percentage discount on convenience store purchases) or event types that are not used in 710 and 720 but are associated with the same location (e.g., a discounted price on a car wash, automotive services, etc.).

In further embodiments, the computing device may not immediately notify the client device, but may store the new event value to notify the client device at a future time.

In still further embodiments, the computing device can store multiple notifications for the same identifier at the same location, and the values of the notifications can accumulate with each new notification. If the discount is not used, the next time a new event value is stored for the same identifier and the same location, the notification sent to the user can include a new event value that is a further increased discount.

If, in 720, the computing device determines that the actual first event frequency is less than the expected frequency (720; NO), the process can proceed to 740.

In 740, the computing device can determine if an actual second event type frequency during a current time window is greater than or equal to an expected frequency for the identifier and the second event type. For example, based on previously event data, the computing device can determine that the identifier is associated with two previous events of the second event type during the current time window (e.g., the current calendar month).

If, in 740, the computing device determines that the actual second event type frequency is greater than or equal to the expected frequency (740; YES), the process can proceed to 760.

In 760, the computing device can notify the client device of a new event value for the second event type. The client device can be running an application, and the application can automatically display or otherwise notify a user of the new event value for the second type of event. As an example, the new event value can be a percentage discount on convenience store purchases. The new event value can be determined, in some embodiments, using the process described above with regard to FIG. 5.

In other embodiments, the computing device can notify the client device of a new event value for another event type, such as the first event type (e.g., a discounted price on gasoline) or event types that are not used in 710-740 but are associated with the same location (e.g., a discounted price on a car wash, automotive services, etc.).

In further embodiments, the computing device may not immediately notify the client device, but may store the new event value to notify the client device at a future time.

In still further embodiments, the computing device can store multiple notifications for the same identifier at the same location, and the values of the notifications can accumulate with each new notification. If the discount is not used, the next time a new event value is stored for the same identifier and the same location, the notification sent to the user can include a new event value that is a further increased discount.

If, in 740, the computing device determines that the actual second event type frequency is less than the expected frequency (740; NO), the process can proceed to 750.

In 750, the computing device can notify the client device of an intermediate event value. As an example, the intermediate event value can be a percentage discount for a convenience store purchase that is greater than zero but is a lower percentage than a new event value that would otherwise be determined in 760. The intermediate event value can be determined, in some embodiments, based on the process described above with regard to FIG. 5. For example, the intermediate event value can be a numerical average between the new event value, as determined in FIG. 5, and a regular event value.

Figure 8:
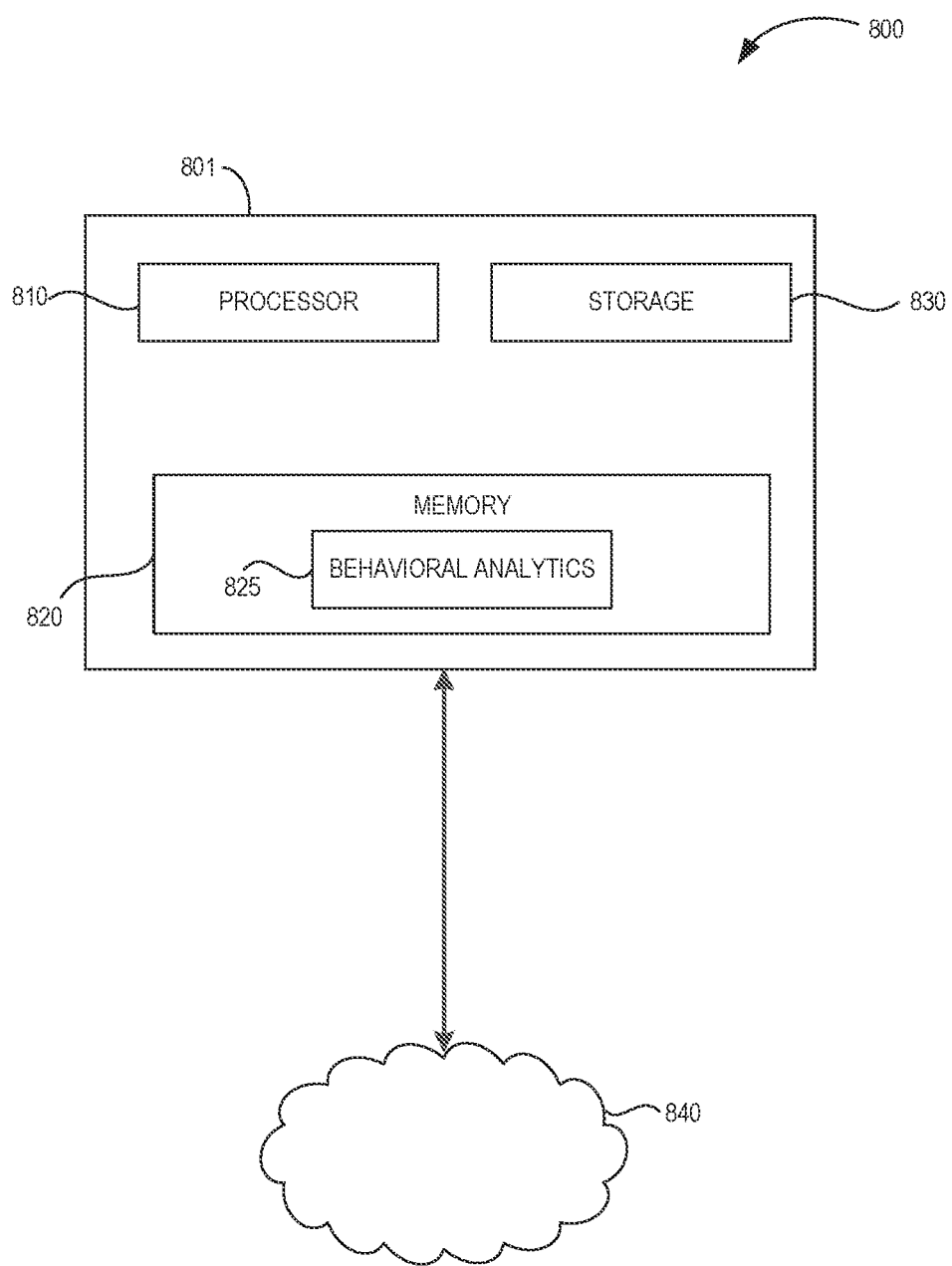
FIG. 8 is a diagram illustrating an example of a hardware system for performing and using behavioral analytics, consistent with certain disclosed embodiments.

FIG. 8 is a diagram illustrating an example of a hardware system for performing and using behavioral analytics, consistent with certain disclosed embodiments. An example hardware system 800 includes example system components that may be used. The components and arrangement, however, may be varied.

The computer 801 may include a processor 810, a memory 820, a storage 830, and input/output (I/O) devices (not pictured). The computer 801 may be implemented in various ways and can be configured to perform any of the embodiments described above. In some embodiments, the computer 801 can be a client device such as, for example, a desktop computer, a laptop, a mobile device (e.g., a smartphone or a tablet device), etc. In other embodiments, the computer 801 can be a computing device such as, for example, a database server, a web server, a mainframe computer, etc. For example, the computer 801 can be one or more of the server system 102, the provider devices 120 and 122, and the client devices 110 and 112 in FIG. 1. The computer 801 may be standalone or may be part of a subsystem, which may, in turn, be part of a larger system.

The processor 810 may include one or more known processing devices, such as a microprocessor from the Intel Core™ family manufactured by Intel™, the Phenom™ family manufactured by AMD™, or the like. The memory 820 may include one or more storage devices configured to store information and/or instructions used by the processor 810 to perform certain functions and operations related to the disclosed embodiments. The storage 830 may include a volatile or non-volatile, magnetic, semiconductor, tape, optical, removable, non-removable, or other type of computer-readable medium used as a storage device. In some embodiments, the storage 830 can include, for example, historical event data.

In an embodiment, the memory 820 may include one or more programs or subprograms including instructions that may be loaded from the storage 830 or elsewhere that, when executed by the computer 801, perform various procedures, operations, or processes consistent with disclosed embodiments. For example, the memory 820 may include a behavioral analytics program 825 for performing collision decay analyses, performing cohort analyses, obtaining new event values, communicating information to other devices, providing a graphical user interface, notifying users of new event values or incremental event values, etc., according to various disclosed embodiments. The memory 820 may also include other programs that perform other functions, operations, and processes, such as programs that provide communication support, Internet access, etc. The behavior analytics program 825 may be embodied as a single program, or alternatively, may include multiple sub-programs that, when executed, operate together to perform the function of the behavior analytics program 825 according to disclosed embodiments. In some embodiments, the behavior analytics program 825 can perform all or part of the processes of FIGS. 2-7, described above.

The computer 801 may communicate over a link with a network 840. For example, the link may be a direct communication link, a local area network (LAN), a wide area network (WAN), or other suitable connection. The network 840 may include the internet, as well as other networks, which may be connected to various systems and devices.

The computer 801 may include one or more input/output (I/O) devices (not pictured) that allow data to be received and/or transmitted by the computer 801. I/O devices may also include one or more digital and/or analog communication I/O devices that allow the computer 801 to communicate with other machines and devices. I/O devices may also include input devices such as a keyboard or a mouse, and may include output devices such as a display or a printer. The computer 801 may receive data from external machines and devices and output data to external machines and devices via I/O devices. The configuration and number of input and/or output devices incorporated in I/O devices may vary as appropriate for various embodiments.

Example uses of the system 800 can be described by way of example with reference to the embodiments described above.

While the teachings have been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

What is claimed is:

1. A computing system comprising:
one or more processors; and
a memory system having stored therein instructions that, when executed by the one or more processors, cause the one or more processors to perform operations comprising:
determining, in historical event data, identifier collisions based on short identifiers associated with a first event location and short identifiers associated with a second event location geographically dispersed from the first event location;
performing behavior analytics on a plurality of short identifiers in the historical event data to generate behavioral models associated with the plurality of short identifiers;
generating adjusted behavioral models based on the determined identifier collisions;
obtaining a short identifier;
determining, based on the obtained short identifier, an adjusted behavioral model from among the adjusted behavioral models;
determining an expected event frequency based on the adjusted behavioral model;
determining an actual event frequency; and
transmitting an indication of an incremental event value based on a determination that the expected event frequency is greater than the actual event frequency, whereby a notification corresponding to the indication of the incremental event value is displayed to a user.

2. The computing device of claim 1, wherein the operations further comprise:
determining whether a total event value of a first event type of the first event location exceeds a baseline value of the first event type; and
calculating one of a new event value for the first event type or an incremental event value for the first event type based on whether the total event value of the first event type exceeds the baseline value of the first event type.

3. The computing device of claim 2, wherein the operations further comprise:
determining whether a total event value of a second event type exceeds a baseline value of the second event type; and
notifying the client device using the incremental event value of the first event type based on whether the total event value of the second event type exceeds the baseline value of the second event type.

4. The computing system of claim 1, wherein the operations further comprise:
calculating a new event value for a first event type of the first event location, the calculating the new event value for the first event type comprising:
obtaining a probability associated with the obtained short identifier, the first event type, and the first event location,
obtaining a minimum value for the first event type at the first event location,
obtaining a weighting value for the first event type based on previous events associated with the short identifier, and
determining the new event value for the first event type based on the probability, the minimum value, and the weighting value.

5. The computing system of claim 1, wherein the operations further comprise:
determining, for the obtained short identifier, a corresponding cohort for the first event type; and
determining the expected event frequency for the first event type based on the determined corresponding cohort for the first event type.

6. A method comprising:
determining, in historical event data, an average percentage of identifier collisions based on short identifiers associated with a first event location and short identifiers associated with a second event location geographically dispersed from the first event location;
assigning a first short identifier associated with at least one event in the historical event data to a cohort associated with a first event type of the first event location;
assigning the first short identifier to a cohort associated with a second event type of the first event location, the second event type being different from the first event type;
while a next first short identifier exists, performing:
obtaining a next first short identifier, and
repeating the assigning of the first short identifier to the cohort associated with the first event type and the assigning of the first short identifier to the cohort associated with the second event type;
performing behavior analytics on the cohort associated with the first event type and the cohort associated with the second event type to generate behavioral models associated with the plurality of first short identifiers;
generating adjusted behavioral models based on the determined average percentage of identifier collisions;
obtaining a short identifier from a client device;
determining, based on the obtained short identifier from the client device, an adjusted behavioral model;
determining whether the short identifier is associated with a previous event of a first event type at the first event location;
calculating one of a new event value for the first event type or an incremental event value for the first event type based on whether or not the short identifier is associated with the previous event of the first event type; and
notifying the client device using either the new event value or the incremental event value,
whereby the client device displays a notification regarding either the new event value or the intermediate event value in response to receiving either the notification of the new event value or the notification of the incremental event value.

7. The method of claim 6, further comprising:
determining whether a total event value of the first event type exceeds a baseline value of the first event type; and
calculating the one of the new event value for the first event type or the incremental event value for the first event type based on whether the total event value of the first event type exceeds the baseline value of the first event type.

8. The method of claim 7, further comprising:
determining whether a total event value of a second event type exceeds a baseline value of the second event type; and
notifying the client device using the incremental event value of the first event type based on whether the total event value of the second event type exceeds the baseline value of the second event type.

9. The method of claim 6, further comprising:
calculating the new event value for the first event type, the calculating the new event value for the first event type comprising:
obtaining a probability associated with the obtained short identifier from the client device, the first event type, and the first event location,
obtaining a minimum value for the first event type at the first event location,
obtaining a weighting value for the first event type based on previous events associated with the short identifier, and
determining the new event value for the first event type based on the probability, the minimum value, and the weighting value.

10. The method of claim 6, further comprising:
determining, for the obtained short identifier from the client device, a corresponding cohort for the first event type; and
determining an expected event frequency for the first event type based on the determined corresponding cohort for the first event type.

11. A method performed by a computing device, the method comprising:
determining, in historical event data, identifier collisions based on short identifiers associated with a first event location and short identifiers associated with a second event location geographically dispersed from the first event location;

performing behavior analytics on a plurality of short identifiers in the historical event data to generate behavioral models associated with the plurality of short identifiers;

generating adjusted behavioral models based on the determined identifier collisions;

obtaining a short identifier;

determining, based on the obtained short identifier, an adjusted behavioral model from among the adjusted behavioral models;

determining an expected event frequency based on the adjusted behavioral model;

determining an actual event frequency; and transmitting an indication of an incremental event value based on a determination that the expected event frequency is greater than the actual event frequency, whereby a notification corresponding to the indication of the incremental event value is displayed to a user.

12. A non-transitory computer-readable medium having instructions recorded thereon for at least one processor of a computing device, wherein the instructions configure the at least one processor to perform operations comprising:

determining, in historical event data, identifier collisions based on short identifiers associated with a first event location and short identifiers associated with a second event location geographically dispersed from the first event location;

performing behavior analytics on a plurality of short identifiers in the historical event data to generate behavioral models associated with the plurality of short identifiers;

generating adjusted behavioral models based on the determined identifier collisions;

obtaining a short identifier;

determining, based on the obtained short identifier, an adjusted behavioral model from among the adjusted behavioral models;

determining an expected event frequency based on the adjusted behavioral model;

determining an actual event frequency; and transmitting an indication of an incremental event value based on a determination that the expected event frequency is greater than the actual event frequency, whereby a notification corresponding to the indication of the incremental event value is displayed to a user.

13. The non-transitory computer-readable medium of claim 12, wherein the operations further comprise:

determining whether a total event value of the first event type exceeds a baseline value of the first event type; and calculating the one of a new event value for the first event type or the incremental event value for the first event type based on whether the total event value of the first event type exceeds the baseline value of the first event type.

14. The non-transitory computer-readable medium of claim 13, wherein the operations further comprise:

determining whether a total event value of a second event type exceeds a baseline value of the second event type; and notifying the client device using the incremental event value of the first event type based on whether the total event value of the second event type exceeds the baseline value of the second event type.

15. The non-transitory computer-readable medium of claim 12, wherein the operations further comprise:

calculating a new event value for the first event type, the calculating the new event value for the first event type comprising:

obtaining a probability associated with the obtained short identifier, the first event type, and the first event location, obtaining a minimum value for the first event type at the first event location, obtaining a weighting value for the first event type based on previous events associated with the short identifier, and determining the new event value for the first event type based on the probability, the minimum value, and the weighting value.

16. The non-transitory computer-readable medium of claim 12, wherein the operations further comprise:

determining, for the obtained short identifier, a corresponding cohort for the first event type; and determining an expected event frequency for the first event type based on the determined corresponding cohort for the first event type.

* * * * *